United States Patent [19]

Denissen

[11] Patent Number: 5,369,634
[45] Date of Patent: Nov. 29, 1994

[54] TRANSMISSION QUALITY ASSESSMENT ARRANGEMENT

[75] Inventor: Frank L. Denissen, Aartselaar,

[73] Assignee: Alcatel N.V., Amsterdam, Netherlands

[21] Appl. No.: 699,968

[22] Filed: May 14, 1991

[30] Foreign Application Priority Data

May 15, 1990 [EP] European Pat. Off. ........ 90201219.4

[51] Int. Cl.$^5$ ............................................. H04J 1/16
[52] U.S. Cl. ...................................... 370/17; 371/67.1
[58] Field of Search ................... 370/10, 13, 96.1, 60, 370/58.1, 61, 99, 60.1, 94.2; 371/20.1, 27, 21.4, 21.3, 20.4, 37.6, 29.1, 67.1, 69.2, 68.1, 5.1, 15.1, 24

[56] References Cited

U.S. PATENT DOCUMENTS

| | | | |
|---|---|---|---|
| 4,494,230 | 1/1985 | Turner | 370/60 |
| 4,561,090 | 12/1985 | Turner | 370/60 |
| 4,752,929 | 6/1988 | Kantz et al. | 371/24 |
| 5,020,052 | 5/1991 | DePrycker et al. | 370/60 |
| 5,020,055 | 5/1991 | May, Jr. | 370/85.1 |
| 5,027,343 | 6/1991 | Chan et al. | 370/17 |
| 5,040,171 | 8/1991 | Osaki | 370/17 |
| 5,042,032 | 8/1991 | Dighe et al. | 370/61 |
| 5,163,057 | 11/1992 | Grupp | 371/20.4 |
| 5,231,598 | 7/1993 | Ylahos | 371/24 |

OTHER PUBLICATIONS

W. Boghdady, "A Technique For Fault–Detection and . . . ", IEEE Int'l Conf. on Comm., Proceedings vol. 3, pp. 1011–1512, May 14–17, 1984.

*Primary Examiner*—Douglas W. Olms
*Assistant Examiner*—Dang Ton
*Attorney, Agent, or Firm*—Robbins, Berliner & Carson

[57] ABSTRACT

Transmission quality assessment arrangement for a communication switching system wherein a stream of cells of information is transmitted from an input (I) to an output (O) over a same communication path. It is adapted, at the input, to insert in the cell stream test cells each having a tag indicative of its position in the resultant cell stream and to count, at the output, the position of each test cell in the latter cell stream. From the difference of the position counted and that stored in the leg of a test cell an indication of the number of added or lost cells—indicative of the transmission quality—is derived.

11 Claims, 1 Drawing Sheet

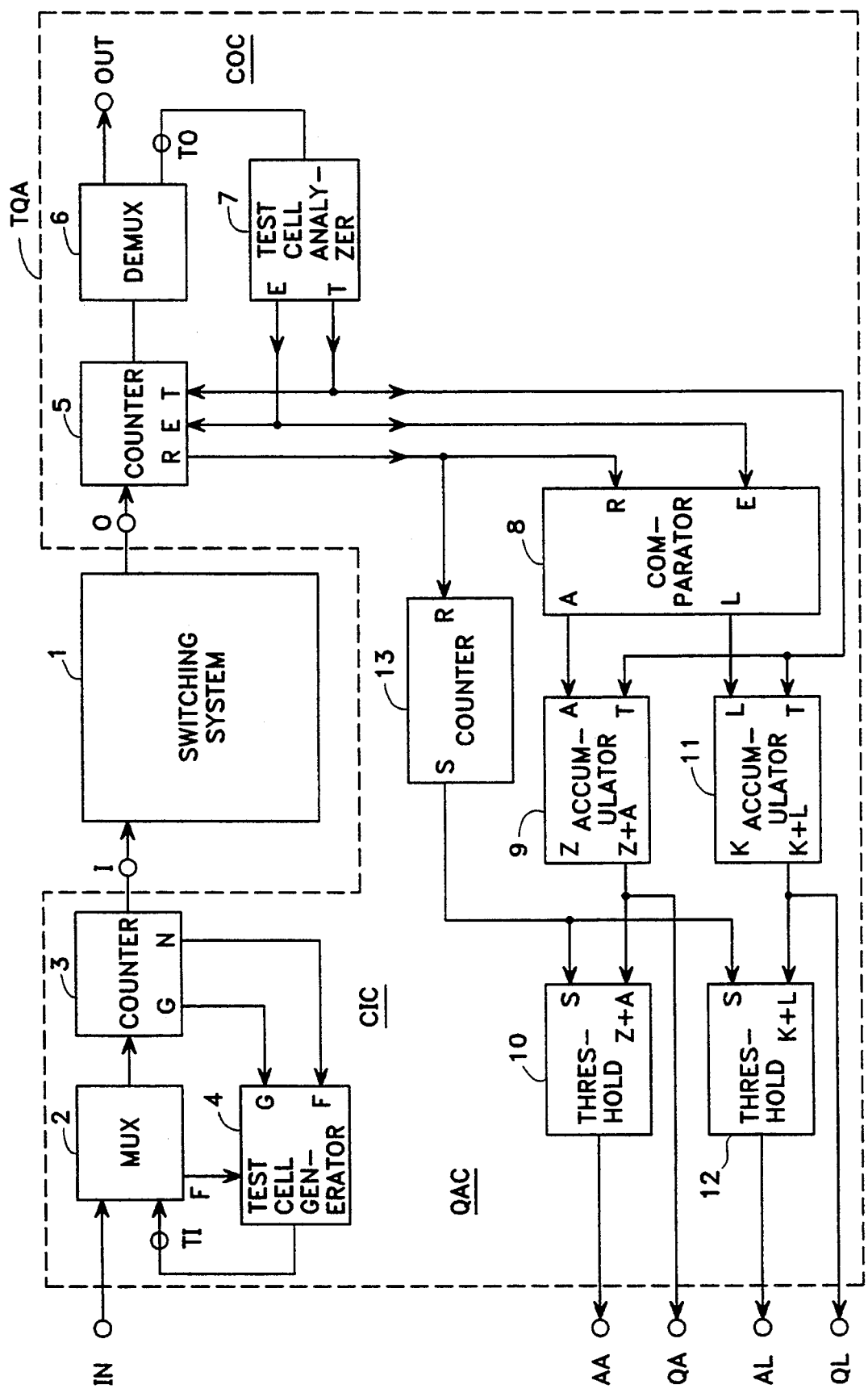

|

TRANSMISSION QUALITY ASSESSMENT ARRANGEMENT

TECHNICAL FIELD

The present invention relates to a transmission quality assessment arrangement for a communication switching system wherein a stream of cells of information is transmitted from an input to an output over a same communication path.

BACKGROUND ART

Such a communication switching system is already known in the art, e.g. from the European patent application No. 8890007.1 (M. DE PRYCKER 2—2) which generally corresponds to commonly assigned U.S. Pat. No. 5,020,052 which issued on May 28, 1991 under the title "Packet Switching Network". Therein a stream of cells of information belonging to a same communication is transmitted over a same virtual communication path established at the start of the communication by means of a path setup cell.

To assess the transmission quality of such a communication it would be possible to number all the cells thereof but this would require too much bandwidth due to cell length increase. Instead, it would also be possible to insert numbered test cells in the stream, each test cell being provided for a predetermined number of cells and to assess the transmission quality by verifying if all the test cells are received at the output. Such a solution has the advantage of using only a limited amount of additional bandwidth but it only permits to verify that due to transmission errors test cells are lost and not that other cells are lost or that cells are added to the communication. So the accuracy of the arrangement is relatively small.

DISCLOSURE OF INVENTION

An object of the present invention is to provide a more effective transmission quality assessment arrangement which while using a limited amount of additional bandwidth nevertheless allows to assess the transmission quality with a relatively higher accuracy.

According to the invention the object is achieved due to the fact that it includes :
- an input circuit associated to said input and able to insert in said cell stream at least one test cell having an associated tag indicative of its position within the thus obtained resultant cell stream;
- an output circuit associated to said output and able to count the position of said test cell in said resultant cell stream; and
- a quality assessment circuit including a comparator (8) to compare the counted test cell position with the position indicated by the tag thereof and evaluation circuitry coupled to said comparator to derive from said comparison an indication of the cell transmission quality.

Since the difference of the counted cell position and the position indicated by the tag indicates the number of cells which have been lost or added it is a good indication of the transmission quality of the cells.

BRIEF DESCRIPTION OF DRAWINGS

The above mentioned and other objects and features of the invention will become more apparent and the invention itself will be best understood by referring to the following description of an embodiment taken in conjunction with the accompanying drawing which shows a communication switching system 1 to which a transmission quality assessment arrangement device TQA according to the invention is associated.

In this drawing the connections between the blocks are all represented by single wires although each of them may be constituted by a plurality of such wires.

BEST MODE FOR CARRYING OUT THE INVENTION

The communication switching system 1 is for instance a digital swiching system of the type disclosed in the above mentioned European patent application No. 88900074.1 In such a switching system cells or packets of information belonging to a same communication are transmitted from any of a plurality of inputs to any of a plurality of outputs along a same virtual transmission path which has been determined previously by a path setup cell. Since in the following description only a single communication on a same path will be considered only one input terminal I and one output terminal 0 of this path in the switching system 1 are shown.

The transmission quality assessment arrangement TQA includes a cell input circuit CIC coupled to input terminal I, a cell output circuit COC coupled to output terminal 0 and a transmission quality assessment circuit QAC coupled to the cell output circuit COC.

The cell input circuit CIC comprises a cell input and multiplexer circuit 2, a cell input counter 3 and a test cell generator 4. The input multiplexer circuit 2 has a normal cell input IN, a test cell input TI, an enable output F connected to the test cell generator 4 and an output which is coupled to the input terminal I of the switching system 1 via the counter 3 having an enable output G and a count output N both coupled to like named inputs of the test cell generator 4. The output thereof is connected to the test cell input TI of the input and multiplexer circuit 2. The enable output F is activated when the circuit 2 detects that there is a free cell position because no normal cell has been received, whilst the enable output G is activated when the counter 3 has counted a predetermined number of cells, say M.

The cell output circuit COC comprises a cell output counter 5, a cell output and demultiplexer circuit 6 and a test cell analyser 7. The output terminal 0 of the switching system 1 is connected, via the cell output counter 5, to the input of the output and demultiplexer circuit G having a normal cell output OUT as well as a test cell output TO which is coupled to the like named input of the test cell analyzer 7 provided with a trigger output T and a number output E. The latter outputs are coupled to like named inputs of the counter 5 and of the test quality assessment circuit QAC to which also a count output R of the counter 5 is connected.

The quality assessment circuit QAC comprises a comparator 8, an added cells accumulator 9, an added cells threshold circuit 10, a lost cells accumulator 11, a lost cells threshold circuit 12, and a modulo cell counter 13. The circuits 9, 10, 11, 12 and 13 constitute evaluation circuitry. The respective outputs R and E of the counter 5 and the test cell analyzer 7 are coupled to inputs of the comparator 8. The latter has outputs A and L which are coupled to like named increment inputs of the accumulator 9 and 11 respectively, both these accumulators having an enable input T to which the enable output T of the analyzer 7 is linked. The accumulators 9 and 11 have respective sum outputs Z+A and K+L which constitute respective output terminals QA and QL of the TQA and which are moreover coupled to like named inputs of the threshold circuits 10 and 12. The latter also have a reset input S connected to an output of the counter 13 whose input R is connected to the count output R of counter 5. Outputs AA and AL of the threshold circuits 10 and 12 constitute alarm output terminals of the TQA.

The above described transmission quality assessment arrangement TQA operates as follows when normal cells belonging to a same communication are applied to the input terminal IN. Each of these cells has a header and a data field: the header contains information identifying the communication to which the cell belongs and a tag indicating that it is a normal cell, whilst the data field contains data.

When such a normal cell is applied to the input terminal IN the cell input and multiplexer circuit 2 derives therefrom that a normal cell is concerned and feeds the latter to the counter 3 which counts the cell and then applies it to the input terminal I of the switching system 1. The counter 3 also provides at its count output N a number equal to the normal cell count plus 1 and applies it to the generator A. However, this signal has no effect on the generator 4 as long as the enable inputs G and F thereof are not simultaneously activated.

In the switching system 1 the cell is transmitted to the output terminal 0 where it is counted by the counter 5 and then applied to the output terminal OUT via the cell output and demultiplexer circuit 6 after the latter has detected from the cell header that a normal cell is concerned.

To be noted that the cell count provided at the output R of the counter 5 is applied to both the comparator 8 and the modulo counter 13 of the quality assessment circuit QAC which will be considered later.

Returning to the cell input circuit CIC, when the input and multiplexer circuit 2 detects the absence of a normal input cell and therefore a free cell position it activates its enable output F. However this has no effect as long as the counter 3 has not reached the cell count M. When this happens this counter 3 provides the cell count M+1 to the generator 4 and as a consequence the latter then generates a test cell similar to a normal communication cell i.e. with a header containing information relating to the communication to which the test cell belongs and an identification tag indicative of a test cell, and with a data field storing a position indicating tag constituted by the above cell count or cell position M+1. The test cell thus generated is applied to the test cell input TI of the input and multiplexer circuit 2 and is then transmitted via the counter 3 and the switching system 1 to the counter 5 as the (M+1)th cell of the communication i.e. of the resultant cell stream of normal and test cells. In the counter 5, amongst the others, the test cell is counted and the count value M+1 is applied to the inputs R of 8 and 13, the test cell being applied to the output and demultiplexer circuit G. When the latter finds out that a test cell is concerned it applies the test cell to the test cell analyzer 7 via its output TO. The analyzer 7 then extracts the position indicating tag M+1 from the data field of the test cell and applies it to the count inputs E of the cell counter 5 and of the comparator 8. It also activates its trigger output T to indicate that it has received a test cell. As a consequence of M+1 being applied to the input E of the counter 5 the count value stored therein is changed to M+1 if it was not previously in that condition and in the comparator 8 the value at the input R is compared with the value M+1 at the input E. Because under normal circumstances both values are equal the values appearing on the outputs A and L of the comparator 8 are both equal to 0. Indeed, at the output A the comparator 8 provides the difference value R−E which is zero or positive when the cell count R is equal to or larger than the expected cell count indicated by the number M+1 provided on the output E. This happens when everything is normal or when cells have been added to a communication respectively, the number of added cells being equal to R−E. In an analogous way, at its output L the comparator 8 provides the difference value E−R which is zero or positive when the cell count R is equal to or smaller than the expected cell count M+1 provided at the output E, This happens when everything is normal or when cells have been lost from a communication respectively, the number of lost cells being equal to E−R.

Supposing everything is normal the values A=0 and L=0 are added to the accumulator values Z and L supposed to be already stored in the accumulators 9 and 11 respectively. The resultant values Z+A and K+L are provided at the respective outputs QA and QL when the enable signal T is activated.

These values are indicative of the quality of the transmission since they indicate the number of added and lost cells respectively at the moment of arrival of a test cell.

The values Z+A and K+L are also applied to the threshold circuits 10 and 12 each of which activates the signal of its respective alarm output AA or AL when the value Z+A or K+L exceeds a respective threshold value. However, in order that an alarm signal should only be given when the ratio of the number of added or lost cells and a predetermined total number of cell exceeds a predetermined limit value, each of the threshold circuits is reset when the modulo counter 13 has counted this predetermined total number and has accordingly activated its output S.

When due to a transmission error one or more cells have been added to a communication, e.g. by transformation of a cell from another communication, it is clear that the cell count R provided by the counter 5 when the test cell with number M+1 is received will be larger than M+1, say M+n, so that the value (M+n)−(M+1)=n−1 or A will appear at the output A of the comparator 8 and will be added in the accumulator 9 to the value Z of previously added cells stored therein. When the resultant value Z+A exceeds the threshold of circuit 10 before it has been reset by the counter 13 via its output S the alarm output AA will be activated. Necessary measures may then be taken to remove the error.

In an analogous way, when due to a transmission error one or more cells of a communication have been lost it is likewise clear that the cell count R provided by the counter 5 when the test cell with number M+1 is received will be smaller than M+1, say M−m, so that the value (M+1)−(M−m)=m+1 or L will appear at the output L of the comparator 8 and will be added in the accumulator 12 to the value K of previously lost cells stored therein. When the resultant value K+L exceeds the threshold of circuit 12 before it has been reset by the counter 15 via its output S the alarm output AL will be activated.

The generator circuit 4 also preferably includes a timer (not shown) which independently from the condition of the inputs G and F generates a test cell each time a predetermined time interval has elapsed and applies it to the multiplexer input TI having priority over the other input IN thereof. In this way one is sure that a minimum number of test cells will be transmitted.

While the principles of the invention have been described above in connection with specific apparatus, it is to be clearly understood that this description is made only by way of example and not as a limitation on the scope of the invention.

I claim:

1. Transmission quality assessment arrangement for a communication switching system in which a cell stream of information cells is transmitted from an input to an output over a common communication path, said arrangement comprising:

an input circuit associated with said input for inserting in an original cell stream a test cell having an associated tag not present in the original cell stream and corresponding to a first count indicative of an original cell position at which the test cell was inserted in the original cell stream to thereby form a modified cell stream which is transmitted over the common communication path;

an output circuit associated with said output for counting the cells in said modified cell stream to thereby determine a second count indicative of the final cell position of said test cell in said modified cell stream after it has been transmitted over the common communication path and received by the output; and a quality ascertaining circuit further comprising a comparator for comparing said first count with said second count and evaluation circuitry coupled to said comparator for deriving from said comparison an indication of the cell transmission quality.

2. Transmission quality assessment arrangement for a communication switching system in which a cell stream of information cells is transmitted from an input to an output over a common communication path, said arrangement comprising:

an input circuit associated with said input for inserting in an original cell stream a test cell having an associated tag not present in the original cell stream and corresponding to a first count indicative of an original cell position at which the test cell was inserted in the original cell stream to thereby form a modified cell stream which is transmitted over the common communication path, said input circuit further comprising a test cell generator and a first cell counter for determining said first count by counting the cells of said modified cell stream and for providing said first count to said test cell generator at least when a test cell has to be inserted in said original cell stream an output circuit associated with said output for counting the cells in said modified cell stream to thereby determine a second count indicative of the final cell position of said test cell in said modified cell stream after it has been transmitted over the common communication path and received by the output; and a quality ascertaining circuit further comprising a comparator for comparing said first count with said second count and evaluation circuitry coupled to said comparator for deriving from said comparison an indication of the cell transmission quality.

3. Transmission quality assessment arrangement according to claim 2, wherein said input circuit further comprises an input and multiplexer circuit to respective inputs of which said original cell stream and said test cell are applied and whose output is coupled to said switching system input via said first cell counter.

4. Transmission quality assessment arrangement according to claim 3, wherein said test cell generator allows a test cell to be inserted in said original cell stream when simultaneously a free cell position is available therein as indicated by an activated output signal of said input and multiplexer circuit and said first cell counter has counted a predetermined number of cells of said modified cell stream as indicated by an activated output signal of said first counter.

5. Transmission quality assessment arrangement according to claim 2, wherein said test cell generator allows a test cell to be inserted in said original cell stream when a predetermined time interval counted by a timer has elapsed.

6. Transmission quality assessment arrangement according to claim 2, wherein said first cell counter has a count output which is coupled to said test cell generator and on which appears cell position indicating information equal to the count value of said first cell counter plus 1.

7. Transmission quality assessment arrangement for a communication switching system in which a cell stream of information cells is transmitted from an input to an output over a common communication path, said arrangement comprising:

an input circuit associated with said input for inserting in an original cell stream a test cell having an associated tag indicative of an original cell position at which the test cell was inserted in the original cell stream to thereby form a resultant modified cell stream before it is transmitted over the common communication path;

an output circuit associated with said output for measuring a final cell position of said test cell in said modified cell stream after it has been transmitted over the common communication path and received by said output, said output circuit further comprising a cell counter to count the cells of an output cell stream corresponding to said modified cell stream and to provide this count value on a count output and a test cell analyzer circuit to analyze said test cell from said modified cell stream and to provide on an analyzer output the original cell position indicating tag thereof; and a quality ascertaining circuit further comprising a comparator coupled to said count output and to said analyzer output for comparing the final cell position of said test cell with the original cell position indicated by said associated tag and evaluation circuitry coupled to said comparator for deriving from said comparison an indication of the cell transmission quality, wherein said comparator provides the difference of the count value provided by said cell counter and of a second count corresponding to said original cell position indicating tag.

8. Transmission quality assessment arrangement according to claim 7, wherein said output circuit further comprises an output and demultiplexer circuit said switching system output is coupled to an input of said output circuit and demultiplexer circuit through said second cell counter and said output and demultiplexer circuit has a first output providing an unmodified cell stream corresponding to said original input cell stream and a second output which is coupled to said test cell analyzer and provides said test cell thereat.

9. Transmission quality assessment arrangement according to claim 7, wherein said analyzer output is also coupled to a count input of said cell counter to make the count value thereof equal to that provided at said analyzer output.

10. Transmission quality assessment arrangement according to claim 8, wherein said comparator has a first output providing said difference when the latter is positive and a second output providing the reverse of said difference when the latter is negative, said first and second comparator outputs are coupled to respective first and second accumulators, and said first and second accumulators are operated upon a second output of said analyzer circuit being activated when a test cell is provided thereto.

11. Transmission quality assessment arrangement according to claim 10, wherein each of said accumulator outputs is coupled to a respective threshold circuit said threshold circuits are reset by a modulo counter controlled from the count output of said second cell counter, and each said threshold circuit is operated when its associated accumulator reaches a predetermined cell count.

* * * * *